(12) United States Patent
Mendizabal Abasolo et al.

(10) Patent No.: US 12,494,653 B2
(45) Date of Patent: Dec. 9, 2025

(54) CONTROLLING A HYBRID POWER PLANT

(71) Applicant: Siemens Gamesa Renewable Energy Innovation & Technology S.L., Sarriguren (ES)

(72) Inventors: Patxi Mendizabal Abasolo, Cordovilla (ES); Pedro Maria Zudaire Latienda, Ororbia (ES)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 584 days.

(21) Appl. No.: 17/611,774

(22) PCT Filed: May 20, 2020

(86) PCT No.: PCT/EP2020/064152
§ 371 (c)(1),
(2) Date: Nov. 16, 2021

(87) PCT Pub. No.: WO2020/234398
PCT Pub. Date: Nov. 26, 2020

(65) Prior Publication Data
US 2022/0255323 A1    Aug. 11, 2022

(30) Foreign Application Priority Data

May 20, 2019   (ES) .............................. ES201900083
Nov. 15, 2019  (EP) .................................... 19380030

(51) Int. Cl.
*H02J 3/46*   (2006.01)
*H02J 3/00*   (2006.01)
*H02J 3/32*   (2006.01)

(52) U.S. Cl.
CPC ................ *H02J 3/46* (2013.01); *H02J 3/003* (2020.01); *H02J 3/004* (2020.01); *H02J 3/32* (2013.01);
(Continued)

(58) Field of Classification Search
CPC .... H02J 3/46; H02J 3/003; H02J 3/004; H02J 3/001; H02J 2300/24; H02J 2300/28
(Continued)

(56) References Cited

U.S. PATENT DOCUMENTS 9,692,234 B2     6/2017  Mammoli et al.
10,389,262 B2 *  8/2019  Jakob ..................... H02M 1/08
(Continued)

FOREIGN PATENT DOCUMENTS

EP      2733810 A2     5/2014
WO   2013000474 A2     1/2013

OTHER PUBLICATIONS

PCT International Search Report & Written Opinion mailed Jul. 23, 2020 corresponding to PCT International Application No. PCT/EP2020/064152.
(Continued)

*Primary Examiner* — Darrin D Dunn
*Assistant Examiner* — Vi N Tran
(74) *Attorney, Agent, or Firm* — Schmeiser, Olsen & Watts, LLP

(57) ABSTRACT

Provided is a method of operating a hybrid power plant, including energy generating units including a wind park and at least one unit of another type of renewable energy source and including an energy storage system, the method including: creating a power production schedule based on an actual forecast of power production, an actual forecast of energy price and actual hybrid power plant status, the power production schedule including at least scheduled power for
(Continued)

Figure 1:
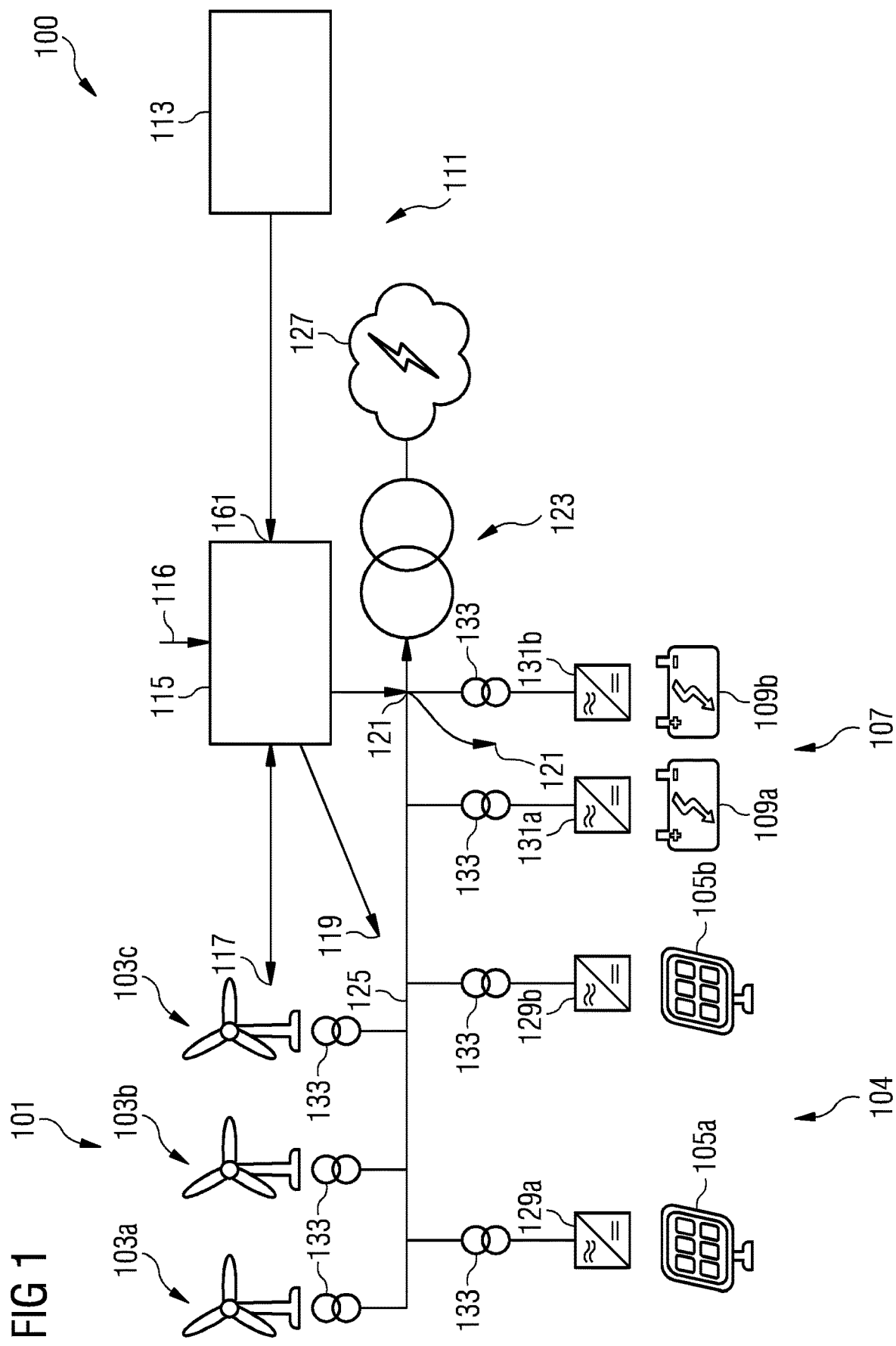

points in time in the future; and controlling, during the points in time in the future the energy generating units and the energy storage system based on the power production schedule, the hybrid power plant status at the points in time in the future, in particular energy storage system status, such as to dispatch power according to the power production schedule, but complying with any grid operator reference at the points in time in the future.

11 Claims, 6 Drawing Sheets

(52) U.S. Cl.
CPC ........... *H02J 3/001* (2020.01); *H02J 2300/24* (2020.01); *H02J 2300/28* (2020.01)

(58) Field of Classification Search
USPC ........................................................ 700/291
See application file for complete search history.

(56) References Cited

U.S. PATENT DOCUMENTS

| | | | | |
|---|---|---|---|---|
| 10,968,891 | B2* | 4/2021 | Gupta | H02J 3/381 |
| 11,351,879 | B2* | 6/2022 | Grace | B60L 53/67 |
| 2009/0326729 | A1* | 12/2009 | Hakim | G06Q 50/06 |
| | | | | 700/295 |
| 2010/0183443 | A1* | 7/2010 | Thorne | H02S 10/12 |
| | | | | 136/244 |
| 2013/0030784 | A1* | 1/2013 | Viassolo | G06Q 10/00 |
| | | | | 703/18 |
| 2013/0141827 | A1* | 6/2013 | Ukil | H02H 3/38 |
| | | | | 361/85 |
| 2013/0261817 | A1 | 10/2013 | Detmers et al. | |
| 2014/0214222 | A1 | 7/2014 | Rouse et al. | |
| 2015/0278968 | A1 | 10/2015 | Steven et al. | |
| 2016/0154397 | A1* | 6/2016 | Guelbenzu Michelena | |
| | | | | H02J 3/381 |
| | | | | 700/295 |
| 2016/0204480 | A1* | 7/2016 | Triebel | H01M 10/425 |
| | | | | 429/50 |
| 2016/0241042 | A1* | 8/2016 | Mammoli | H02M 3/04 |
| 2020/0244070 | A1* | 7/2020 | Sorensen | H02J 3/388 |
| 2022/0029424 | A1* | 1/2022 | Burra | H02J 13/00001 |
| 2022/0140644 | A1* | 5/2022 | Dent | H02J 9/061 |
| | | | | 307/77 |

OTHER PUBLICATIONS

European Search Report for Application No. 19380030.7, dated Apr. 21, 2020.

\* cited by examiner

CONTROLLING A HYBRID POWER PLANT

CROSS-REFERENCE TO RELATED APPLICATIONS

This application claims priority to PCT Application No. PCT/EP2020/064152, having a filing date of May 20, 2020, which is based off of EP Application No. 19380030.7, having a filing date of Nov. 15, 2019, and ES Application No. P201900083, having a filing date of May 20, 2019, the entire contents all of which are hereby incorporated by reference.

FIELD OF TECHNOLOGY

The following relates to a method and to an arrangement of operating a hybrid power plant, including energy generating units comprising a wind park and at least one unit of another type of a renewable energy source and further comprising an energy storage system. The following further relates to a hybrid power plant including the control arrangement.

BACKGROUND

A hybrid power plant including one or more wind turbines and one or more solar power units, such as photovoltaic units, is conventionally known. One drawback of the renewable power plant is the variability of the output power provided to the utility grid and the difficulty of predicting the renewable resource. This conventionally limits the possibility for helping to support the electrical utility grid and comply with predictability and dispatchability required by electrical system operators.

Conventionally, the integration of renewable power plants has been limited to certain scenarios and has not been allowed to participate in certain energy markets.

Thus, there may be a need for a method and a corresponding arrangement of operating a hybrid power plant including energy generating units comprising a wind park and at least one unit of another type of renewable energy source and comprising an energy storage, wherein the control is improved, in particular regarding predictability, support of the utility grid and in particular complying with external set points, for example a grid operator reference.

SUMMARY

According to an embodiment of the present invention it is provided a method of operating a hybrid power plant, including energy generating units comprising a wind park and at least one unit of another type of a renewable energy source and comprising an energy storage system, the method comprising: creating, in particular by an (e.g. remote) energy management system, a power production schedule (relating to a future time span) based on an actual forecast of power production, an actual forecast of energy price and actual hybrid power plant status, the power production schedule comprising at least scheduled (e.g. active) power for points in time in the future; and controlling, during the points in time in the future, in particular by a (e.g. local) plant controller, the energy generating units and the energy storage system based on the power production schedule, the hybrid power plant status at the points in time in the future, in particular energy storage system status, such as to dispatch power according to the power production schedule, but complying with any grid operator reference at the points in time in the future.

The method may be implemented partly in software and/or partly in hardware. The method may be conducted by a single controller or by for example two control elements, such as an energy management system and a local plant controller. The wind park may comprise one or more wind turbines. Each wind turbine may comprise a wind turbine tower, a nacelle mounted on top of the wind turbine tower, the nacelle harbouring an electric generator which is coupled to a rotation shaft at which plural rotor blades are mounted. The at least one unit of another type of renewable energy source may include a sun power unit and/or a tidal power unit for example. The solar power unit may for example comprise a photovoltaic unit which is adapted to convert solar power directly into electric energy. The combination of energy generation units comprising units of type wind power and sun power may be advantageous, since it has been observed that sun irradiance is lower at night times than at day times, while wind power has been observed to be higher at night times compared to daytime. Thus, these types of energy providing or generating units may partly at least complement each other. The energy storage system may comprise one or more electric accumulators or batteries capable of storing or releasing electric energy. The electric energy may for example be stored within the energy storage system as a DC power or energy. Also, the solar power unit or units may output DC power. The DC power output by the solar units and/or the energy storage units, such as batteries, may be converted to a AC power using a converter comprising controllable switches for example.

All energy generating units as well as the units of the energy storage system may be connected at a common busbar via respective transformers wherein the transformation ratio is selected such that the voltage at the secondary side substantially matches. The busbar at which all energy generating units as well as the energy storage system may be connected, may provide the combined power output to a plant transformer which may transform the power to a higher voltage and which may be connected at the secondary side to a utility grid. The primary side or the common busbar of the plant transformer may form a so-called point of common connection.

Between the busbar at which all the energy generating units are connected and also the energy storage system is connected and the primary side of the plant transformer there may be arranged a main (medium voltage) circuit breaker enabling to connect or disconnect the hybrid power plant to the utility grid. At the secondary side of the plant transformer there may be a (high voltage) circuit breaker in order to provide another safety feature for allowing to disconnect the power plant from the utility grid in case of a failure or the like.

The power production schedule may relate to active and/or reactive power to be output by the hybrid power plant in the points in time in the future. For example, the power production schedule may comprise values of the active power to be output by the power plant at for example 1 to 10 or 1 to 100 different time points in the future. The power production schedule may further optionally also comprise for example reactive power values to be output by the energy plant in several points in time in the future. When the power production is scheduled using the power production schedule, the power output may be more predictable than conventionally known. For example, the power production schedule or a portion thereof may be also communicated to a grid operator which may then receive for example several power production schedules from several different power plants. Thereby, the grid operator may also consider these different power production schedules for in turn calculating particular grid operator plant references to be sent to the different power plants.

Creating the power production schedule may be implemented in a particular controller e.g., provided as a service, for example available via a communication network, such as the Internet. Thus, the energy management system may provide a service of calculating or creating a respective energy management or power production schedule for any power plant in need of such a power production schedule. The energy management system may be communicatively connected (for example via the Internet) to the respective local plant controller which thereby may receive the power production schedule.

The local plant controller may then control the hybrid power plant regarding dispatching the power in the points in time in the future. Thereby, the controlling does not only rely on the power production schedule but also relies on the then hybrid power plant status (i.e., at the points in time in the future) and also considers any grid operator reference, such as regarding active power and/or reactive power at the points in time in the future. Thereby, any grid operator reference may have a priority to the corresponding value as comprised in the power production schedule. For example, if the active power comprised in the power production schedule deviates from the grid operator active power reference at the particular point in time in the future, then the power plant will be controlled to comply with the grid operator active power reference.

The controlling the energy generating unit and the energy storage system may comprise controlling for example converters of generators of the wind turbine and may also comprise controlling converters connected to for example solar power units and/or batteries comprised in the energy storage system. The controlling may also involve to control settings of rotor blades of the wind turbines, for example regarding pitch blade angle. The controlling may in particular control the respective power output, for example active power output and/or reactive power output, of the corresponding energy generating unit and/or the energy storage system or energy storage unit(s). According to embodiments of the present invention thereby, the method of operating the hybrid power plant enables to make the hybrid plant predictable, controllable and dispatchable. Furthermore, enhanced system control with respect to other power plant consideration possibilities such as "co-located" generation is enabled.

Creating the power production schedule may involve application of a mathematical model and may also involve an optimization process to optimize a selectable target function. For example, energy output may be optimized and/or profitability may be optimized and/or load of all components may be optimized, or a combination thereof may be optimized.

The forecasts (of power production and/or energy price) may be received from an external source or internally generated by a forecast method, such as weather forecast prediction source and energy price prediction source. The actual hybrid power plant status may in particular comprise charging status of the energy storage system. The actual hybrid power plant status may also comprise additionally or alternatively, the actual active and/or reactive power output of the hybrid power plant. By considering all these inputs, a power production schedule and/or storage power schedule (regarding active and/or reactive power) may be created which may closely resemble the active and/or reactive power actually dispatchable at the points in time in the future.

According to an embodiment of the present invention, the actual forecast of power production comprises: forecast of power due to wind in the geographical region of the wind park and/or forecast of power due to sun irradiance in the geographical region of solar power units comprised in the hybrid power plant. Furthermore, a forecast of wind turbulence may be included. Thereby, the wind turbines may also for example be curtailed or tripped, if the turbulence is too high. The sun irradiance may comprise information regarding the sun power which is expected to be received at a particular area on earth. Thereby, generating or creating the power production schedule may be improved regarding accuracy.

According to an embodiment of the present invention, the power production schedule is created such as to achieve a desired goal, and/or maximize or minimize a (selectable) target function, in particular improve profitability and/or reduce load and/or optimize/maximize power output. Thereby, a high flexibility is provided. The target function may for example be selected depending on the application. The target function may be implemented as for example a mathematical function including one or more operational parameters of the power plant and also include price parameters for different types of energy. For example, different prices for wind power based energy or sun power based energy may be considered.

According to an embodiment of the present invention, the power production schedule is created by applying energy arbitrage and/or applying capacity firming, wherein during applying energy arbitrage the power production schedule is created such that: power produced by the energy generating units is stored in the energy storage system, when the energy price is low and energy is released from the energy storage system, when the energy price is high, wherein during applying capacity firming the power production schedule is created such as to assure a constant and/or predictable output power generation capability. In particular, a mathematical function may maximize the income/profit for a certain time span.

Applying energy arbitrage may maximize the profit that can be gained by operating the hybrid power plant essentially adhering to the power production schedule. In particular, applying energy arbitrage may maximize the profit by considering the different energy prices of a given time span. Further, capacity firming may improve the predictability and dispatch of the power output of the power plant.

According to an embodiment of the present invention, the power production schedule is updated at regular or irregular points in time, in particular periodically. Thereby, regularly or irregularly, for example periodically, new forecast data may be received for example by the energy management system and based thereon a further power production schedule may be created. Thereby, the method takes into account for example changing forecast of power due to wind and/or forecast of power due to sun irradiance and also changing energy prices, as forecasted.

According to an embodiment of the present invention, controlling the energy generating units and the energy storage system is further based on a selected grid code application and/or selected energy source priority. A grid code application may contribute to a utility grid stability or compliance of the utility grid to desired or nominal electrical characteristics, such as voltage and/or frequency. Thereby, the hybrid power plant may support the utility grid regarding stability in a selectable manner.

According to an embodiment of the present invention, at least one other type of a renewable energy source is sun energy, the respective energy generating units comprising solar power units, wherein the energy source priority is selected from the group consisting of: wind power priority: wherein power output of the wind park is maximized, all other types of energy generating units are limited so that a maximum allowed power output or scheduled active power or grid operator reference of the hybrid plant is not exceeded; sun power priority: wherein power output of the solar power units is maximized, all other types of energy generating units are limited so that a maximum allowed power output or scheduled active power or grid operator reference of the hybrid plant is not exceeded; selectable share: when total available power of all renewable energy generating units is above the maximum allowed power output or scheduled active power or grid operator reference, selecting a ratio between total power output of two different types, in particular wind and sun, of renewable energy generating units.

When a particular priority is selected, load at the other renewable energy source not selected may for example be reduced. Furthermore, selecting a priority of power generation of a particular renewable energy source may involve therefore to curtail one or more energy generating units of one or more other types of renewable energy source. Thereby, by curtailing, the maximum power at the point of common connection for example or the total power output of the power plant may efficiently be avoided to be exceeded.

According to an embodiment of the present invention, the selected grid code application is selected from the group consisting of: voltage control at the point of common coupling to which all energy generation units the energy storage system is connected; primary frequency regulation at the point of common coupling; providing spinning reserve, including to store some of the energy generated by a wind turbine of the wind park in the energy storage system; smoothing of power fluctuations at the point of common coupling by discharging or charging the energy storage system depending on fluctuating power generated by the energy generating units; ramp rate depending charging and discharging the energy storage system, wherein charging of the energy storage system is effected with respect to a configured ramp up when the available power of the energy generating units exceeds the configured ramp rate, wherein discharging of the energy storage system is effected with respect to a configured power ramp down, when the available power of the energy generating units falls below the configured ramp rate; base load assurance, wherein capacity of the storage system is selected based on minimum power to be output by the plant and duration of the minimum power to be assured; power curtailment of at least one particular energy generating unit by charging the energy storage system or limiting its power generation; adhering to the schedule active power or the grid operator reference, by appropriately charging/discharging the energy storage system; power limit adherence, wherein the energy storage system is charged in order to keep the plant output power below a given power limit or wherein the energy generating units are controlled to limit their power generation.

Voltage control may for example involve to control reactive power of one or more energy generating units, in order to keep a voltage for example at the point of common coupling or point of common connection at or close to a nominal or desired voltage. Primary frequency regulation may involve to control the active power output of one or more of the energy generating units and/or the energy storage system in order to keep the frequency for example at the point of common coupling essentially or close to a nominal or desired frequency, such as 50 Hz or 60 Hz.

Spinning reserve may allow to inject additional active power into the utility grid for example at later points in time when for example frequency support is needed. Some energy may be kept in the energy storage system and may be injected into the grid if required.

Smoothing may be considered for reducing high frequency power variations making use of the charge/discharge capability of the BESS.

Ramping up and down may involve limiting the rate of change of the power generated in the point of connection, under sustained available power variations, for example due to the increase of power due to a strong wind gust on a wind farm or the fast reduction generated by a cloud passing by a solar plant.

Base load assurance may ensure that the hybrid power plant is capable to output in any situation the minimum power, in particular for a predefined duration time. Thereby, also predictability may be improved. When for example no particular utility grid support is required, the power plant may adhere to the scheduled active power or the grid operator (active power) reference.

By providing a selectable grid code application, flexibility of the controlling of the power plant is improved.

According to an embodiment of the present invention, the selected grid code application is performed, in particular by a local plant controller, considering at least one of: the scheduled power; the plant status; a selected grid code application; and in particular, but not necessarily, at least one grid operator reference. When one or more of the aforementioned factors is considered, it may in particular be assured that the effective output power of the power plant adheres or complies with the at least one grid operator reference, in particular grid operator active power reference. The plant status in particular may comprise the charging status of the energy storage system.

In other embodiments of the present invention there may not be an obligation for having or complying a grid operator reference always. i.e., a nice grid support improvement may be provided with just ramping and frequency regulation, where none of them requires an external grid operator reference to perform. They may work based on local parameter settings.

According to an embodiment of the present invention, the method further comprises in case of a failure of a (e.g., local) controller and plant output power exceeds scheduled active power and/or grid operator reference, in particular grid operator active power reference:

If, plant power output is above a first threshold but below a second threshold: trying to trip at least one energy generating unit; if tripping is not successful: disconnecting at least one energy generating unit; if disconnecting is not successful: opening a main plant breaker (e.g. on a medium voltage side of the transformer), normally connecting the plant to the grid; if opening the main plant breaker fails: a relay at the input of the plant transformer will disconnect the plant from the grid in case of overcurrent.

Thereby, protection of components of the power grid as well as components of the utility grid or a transmission line leading the power to the utility grid may be achieved. The protection may involve a specific programed logic of a relay and an additional protection relay on a breaker. Thereby, it may be assured that the maximum power output for example set by the grid operator or the plant operator is not exceeded.

According to an embodiment of the present invention, the scheduled (active) power and/or the grid operator reference relates to a power at a point of common coupling to which all energy generating units and the energy storage system output their power. The point of common connection may also be implemented as or comprise a busbar at which all the energy generating units and the energy storage units are connected. Each of the energy generating units may be connected to this busbar via for example a breaker and a respective transformer.

It should be understood that features, individually or in any combination, disclosed, described, applied or explained with respect to a method of operating a hybrid power plant also apply, individually or in any combination, to a respective arrangement for operating a hybrid power plant according to embodiments of the present invention and vice versa.

According to an embodiment of the present invention it is provided an arrangement for operating a hybrid power plant, including energy generating units comprising a wind park and at least one unit of another type of a renewable energy source and comprising an energy storage system, the arrangement comprising: an energy management system adapted to create a power production schedule based on an actual forecast of power production, an actual forecast of energy price and actual hybrid power plant status, the power production schedule comprising at least scheduled power for points in time in the future; and a plant controller adapted to control, during the points in time in the future, the energy generating units and the energy storage system based on the power production schedule, the hybrid power plant status at the points in time in the future, in particular energy storage system status, such as to dispatch power according to the power production schedule, but complying with any grid operator reference at the points in time in the future.

The arrangement may comprise one or two portions, namely the energy management system and the plant control. The arrangement may also be implemented as a single control or operating arrangement wherein functionality of the energy management system and the functionality of the plant control are combined. The energy management system and/or the plant control may for example be communicatively coupled to a utility grid operator for enabling receiving the grid operator reference. The energy management system may further be coupled to any forecast information source regarding power due to wind and/or power due solar irradiance and/or energy prices.

According to an embodiment of the present invention it is provided a hybrid power plant, including: energy generating units comprising a wind park and at least one unit of another type of a renewable energy source, in particular sun energy; an energy storage system; and an arrangement according to the preceding embodiment. The hybrid power plant may for example include 1 to 100 or 1 to several hundred wind turbines, 1 to 100 photovoltaic units and 1 to 100 accumulators or batteries.

The power plant may be in different configurations. E.g., due to the particular configuration of the power plant, there may or may not be dedicated breakers for the Wind Farm and the Solar plant. It might be necessary to consider the trip of multiple branches that correspond to certain type of generation. The power plant may have or may not have a MV/HV transformer. Or the power plant could have two parallel transformers instead of one. Other configurations will also be possible.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Figure 2:
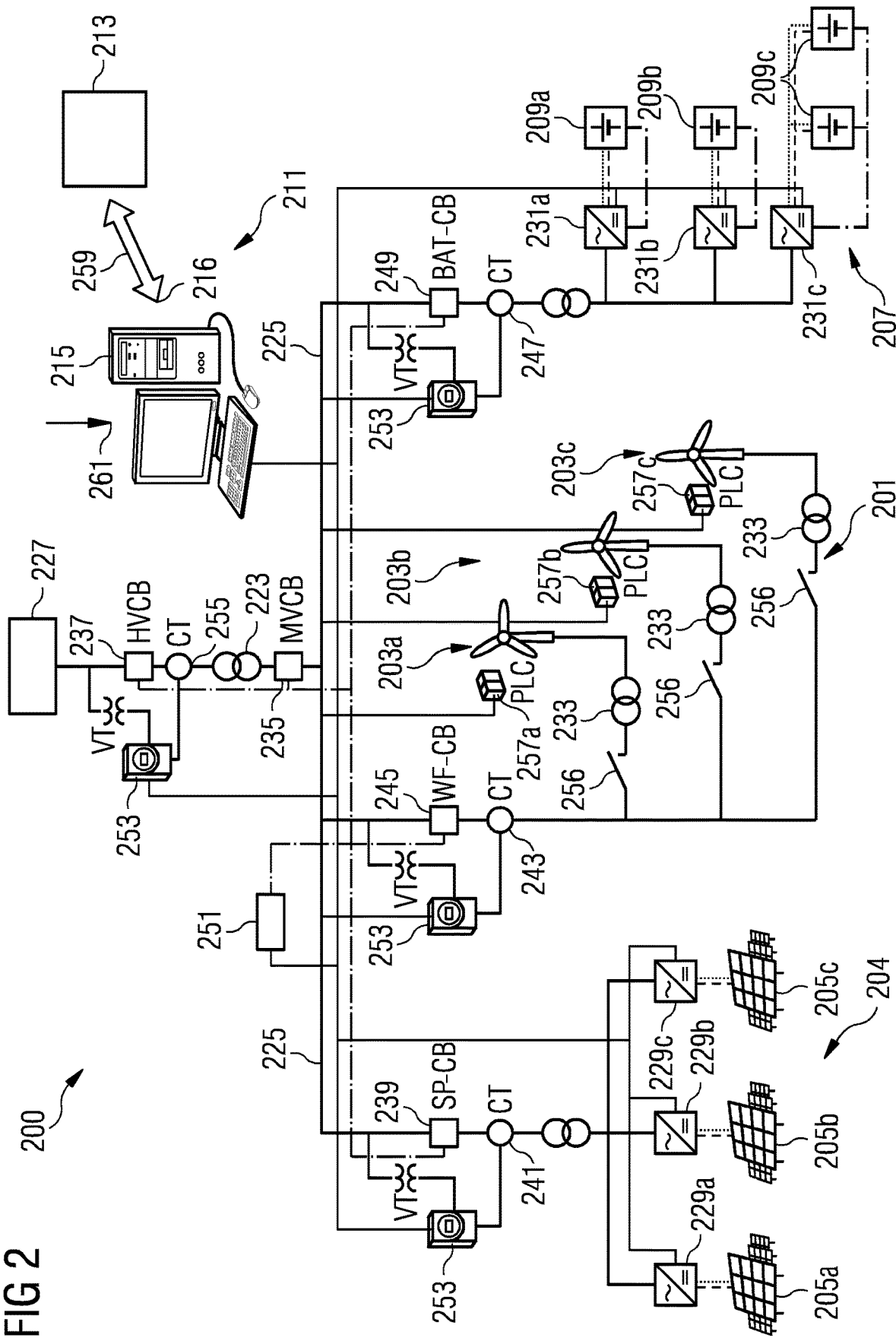
Figure 3:
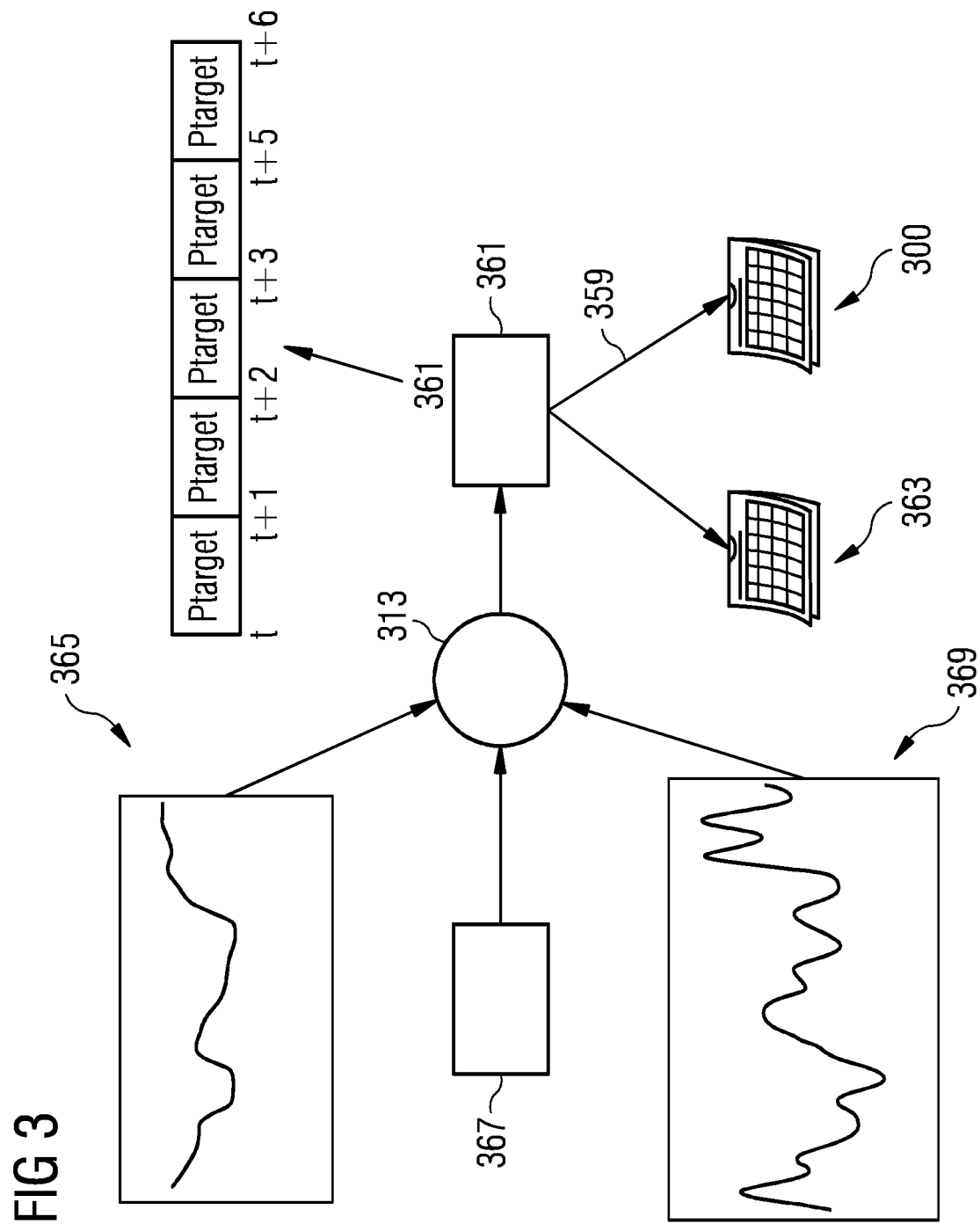
Figure 4:
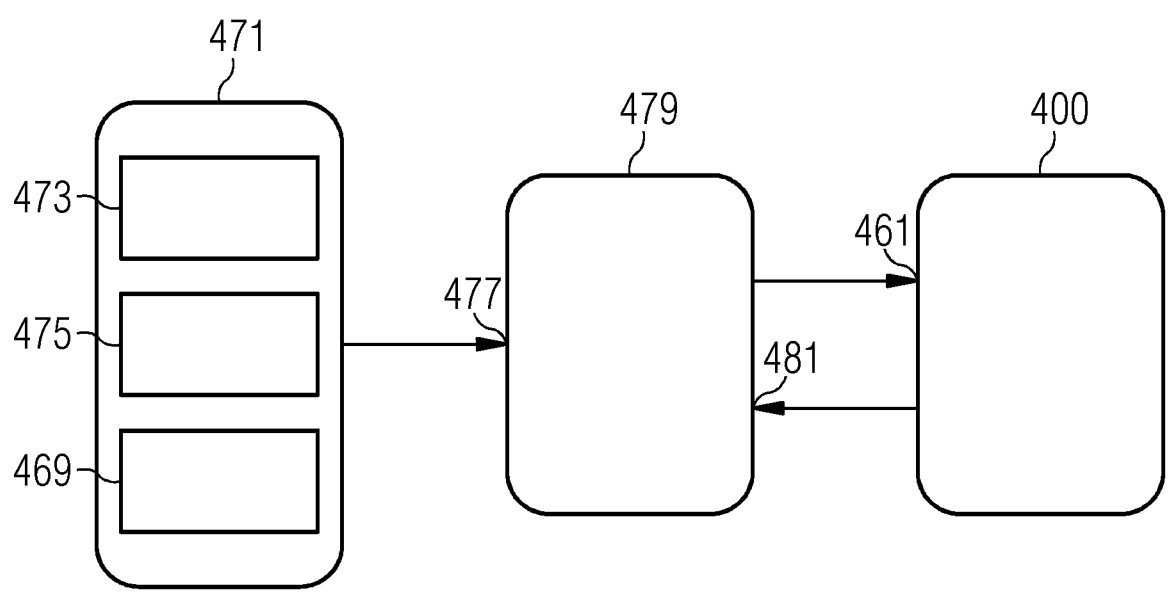
Figure 5:
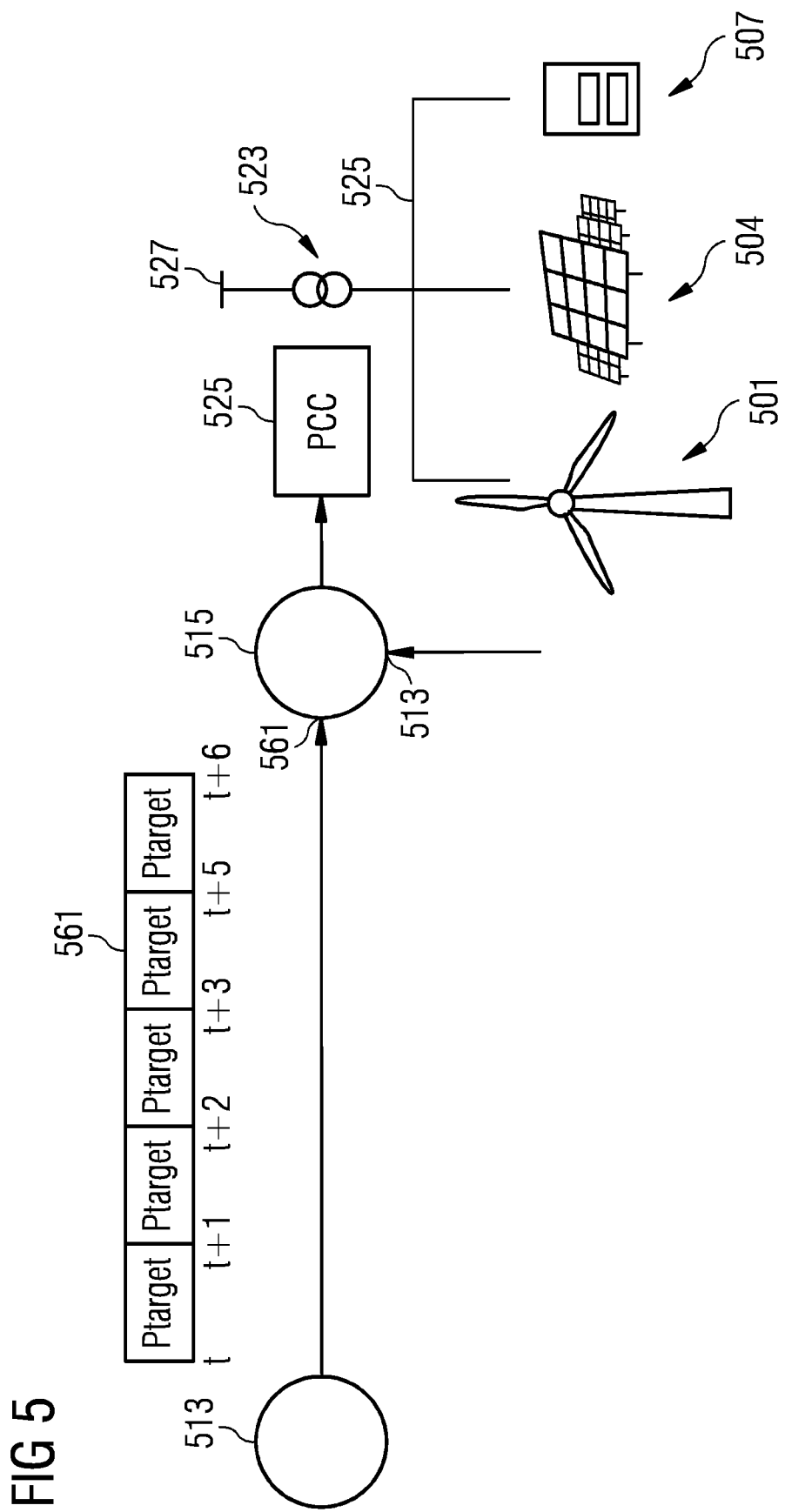
Figure 6:
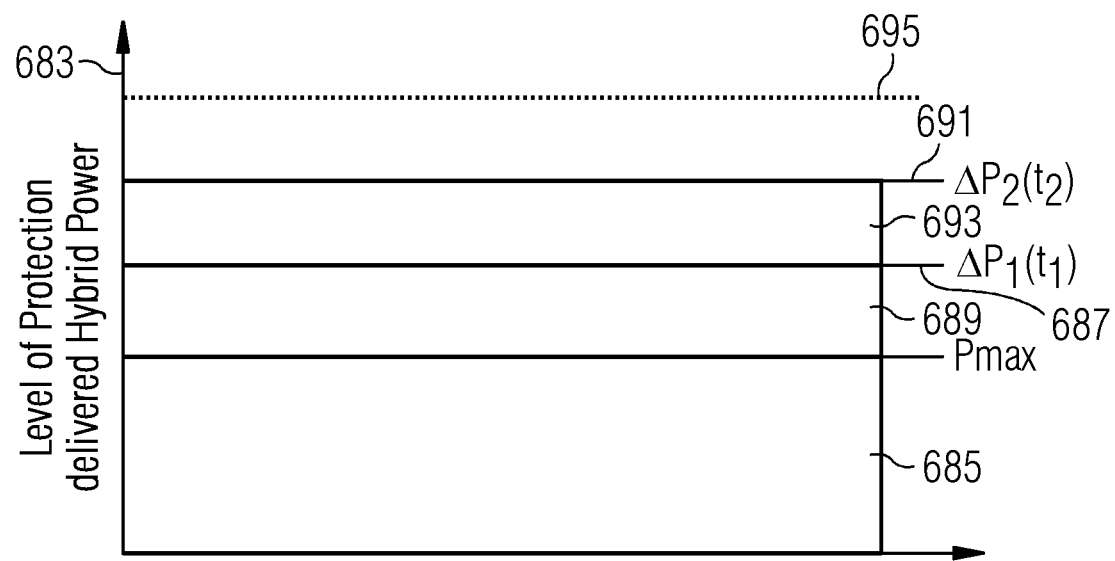

Some of the embodiments will be described in detail, with reference to the following figures, wherein like designations denote like members, wherein:

FIG. 1 schematically illustrates a hybrid power plant according to an embodiment of the present invention;

FIG. 2 schematically illustrates a hybrid power plant according to an embodiment of the present invention;

FIG. 3 schematically illustrates aspects of controlling a hybrid power plant according to an embodiment of the present invention;

FIG. 4 schematically illustrates in a schematic manner a control method according to an embodiment of the present invention;

FIG. 5 schematically illustrates aspects of a hybrid plant control according to embodiments of the present invention; and FIG. 6 illustrates a graph for explaining protection features according to embodiments of the present invention.

DETAILED DESCRIPTION

The illustration in the drawings is in schematic form. It is noted that in different figures, elements similar or identical in structure and/or function are provided with the same reference signs or with reference signs, which differ only within the first digit. A description of an element not described in one embodiment may be taken from a description of this element with respect to another embodiment.

The hybrid power plant 100 schematically illustrated in FIG. 1 comprises energy generating units comprising a wind park 101 and at least one unit 105a, 105b of another type of renewable energy source, in particular sun energy of a wind park 104. The other energy generating units may generate power due to sun irradiance, tidal or any other type or renewable energy source. The hybrid power plant 100 further comprises an energy storage system 107 comprising energy storage elements 109a, 109b. Furthermore, the hybrid power plant 100 comprises an arrangement 111 for operating the hybrid power plant 100. Thereby, the arrangement 111 comprises an energy management system 113 which is adapted to create a power production scheme 161. The arrangement 111 further comprises a local plant controller 115 which receives the power production scheme 161 and controls (via control signals 117, 119, 121) the wind park 101, the solar park 104 and the energy storage system 107, respectively.

The hybrid power plant 100 further comprises a (optional) plant transformer 123 which is connected to a common busbar 125 at which all the energy generating units, i.e. wind turbines 103a, 103b, 103c comprised in the wind park 101, the solar power units 105a, 105b of the solar park 104 and the energy storage unit 109a, 109b of the energy storage system 107 are connected. At a secondary side, the plant transformer 123 outputs the power plant power to a utility grid 127.

The solar park 104 illustrated in FIG. 1 comprises further for each solar power unit 105a, 105b a connected converter 129a, 129b which is adapted to convert the DC power provided by the respective solar power unit to an AC power. Similarly, the DC power provided by the accumulator units or batteries 109a, 109b is converted to AC power using connected converter 131a, 131b. The AC power is transmitted to the common busbar 125 via respective unit transformer 133 which may be adapted for the particular energy generation unit or storage element to provide a nominal output voltage to the common busbar 125.

FIG. 2 schematically illustrates a hybrid power plant 200 according to another embodiment of the present invention in a more detailed manner. As is illustrated in FIG. 2, between the busbar 225 and the (primary) side of the plant transformer 223, a (medium voltage) breaker 235 (MVCB) is provided. Furthermore, between a secondary side of the plant transformer 223 and the utility grid 227, a high voltage circuit breaker 237 (HVCB) is connected. Furthermore, for the wind park 204, a sun protection circuit breaker 239 (SP-CB) is connected between an output terminal 241 of the wind park 204 and the common busbar 225. Between an output terminal 243 of the wind farm 201 and the common busbar 225, a wind farm connection breaker 245 (WF-CB) is connected. Between an output terminal 247 of the energy storage system 207 and the common busbar 225, a battery circuit breaker 249 (BAT-CB) is connected.

Any number of energy generating units of each type may be present and many possible arrangements are possible. Main Breakers for each generation unit in different arrangements may also be present.

The breakers 237, 235, 239, 245, 249 are controlled (in particular tripped) by a substation control unit 251 which is also receiving measurement signals from measurement equipment 253 connected and arranged to measure power and/or voltage and/or current at the corresponding output terminals 241, 243, 247 of the solar plant 204, the wind farm 201 and the energy storage system 207, respectively, and also at the output terminal 255 of the hybrid power plant 200.

In other embodiments the substation control unit 251 may be missing and control may be performed e.g. by the hybrid plant controller 215.
Furthermore, the wind turbines 203a, 203b, 203c are connected to the wind farm output terminal 243 via respective transformers 233 and respective wind turbine breakers 256. Those breakers may also be present for each solar power unit 205a,b,c connected to the respective converter 229a,b,c.

Furthermore, the substation control unit 251 together with or alternatively of the hybrid power plant controller 215 controls the solar plant power unit 205a, 205b, 205c by controlling the connected converters 229a, 229b, 229c. The substation control unit 251 together with or alternatively of the hybrid plant controller 215 further controls the wind turbines 203a, 203b, 203c, by controlling respective control elements 257a, 257b, 257c, respectively. Furthermore, the substation control unit 251 together with or alternatively of the hybrid plant controller 215 also controls one or more of the breakers based on power measurements.

In particular, there may not be any communication or coordination between element 251 and 215. They may be independent systems, wherein controller 251 might be a backup in case the regulation and limit provided by controller 215 fails.

Thereby, for controlling the respective solar plant 204, the wind farm 201 and the energy storage system 207, the hybrid plant controller 215 communicates via communication signals 259 with the remote energy management system 213 which in particular supplies a created power production schedule 261 to the hybrid plant controller 215.

The power plants 100, 200, illustrated in FIG. 1 or 2, represent integrated renewable hybrid power plants, wherein the term "integrated" is used in order to refer to the fact that all generation and storage units are connected directly to the plant control and supervisor system with no intermediate controller unlike in other conventional configurations. This may allow an improved control of the plant production capability and faster response times. It should be understood that other combinations of different types of renewable energy sources such as wind and solar, wind and storage elements, solar and storage elements, wind and solar and storage elements, could be equally eligible.

In other embodiments, not an integrated renewable hybrid power plants is controlled, but another configuration e.g. in a co-located configuration.

According to embodiments of the present invention control of a co-located configuration of a hybrid power plant is provided. Co-located is known to be when two or more generation plants and/or a BESS (battery energy storage system) share the substation and evacuation lines but each of them with a separate control. Typically, a Wind+BESS co-located power plant may have a dedicated control for the Wind Farm and another dedicated control for the BESS which may be limited to correct the output of the Wind Farm. Whereas in the 'integrated' approach according to embodiments of the present invention, there may be full control of each individual unit participating in the power plant.

For example, the solar wind park 104 may have a nominal capacity of about 60 to 80% of the capacity of the wind farm 104. The energy storage system 107 may have for example a capacity of 30% of the capacity of the wind farm 101. Other values are possible.

FIG. 3 schematically illustrates an embodiment of creating a power production schedule 361 by the energy management system 313 as may be comprised within the hybrid power plant 100 or 200 illustrated in FIG. 1 or 2.

Embodiments allow differentiating between local grid control application (GCAp) and a remote energy management system (EMS) to optimize the generation of renewable power plant and comply with the grid code and customer requirements. The target of the energy management system may be to improve the profitability of the generated energy. Thereby, the energy management system 313 may create an optimum production schedule 361 of power references Ptarget, at different time points t, t+1, t+2, t+3, t+4, t+5 in the future. The power schedule 361 is sent for example via communication signals 359 to the hybrid plant 300, in particular, to local controller 115, 215 and/or to the respective energy generating units and the energy storage units. The power schedule 361 may also be shared with other plants or other interesting parties 363.

For generating the power schedule 361, the energy management system 313 receives production forecast data 365, state data 367 of the respective energy storage system and further receives market price forecasts 369. The power production schedule 361 is updated periodically based on the forecast and market prices 365, 369 and also based on the plant state (e.g. at least of the batteries) 367. The local grid control application may be executed by for example the local plant controller 115 illustrated in FIG. 1 or the combination of the hybrid plant controller 215 and the substation control unit 251 as illustrated in FIG. 2. The grid control applications may pursue the compliance of the grid code requirements, as well as also improvising the integration of renewable plants into the utility grid and may help to maintain overall grid stability.

The aim of the energy management system 313 or 213 or 113 illustrated in FIGS. 3, 2 and 1, respectively, may be to provide a remote set of services that will improve the predictability and dispatchability of the energy generated by the respective hybrid power plant 100, 200, 300. These services may require an energy storage system, in particular battery, for example energy storage system 107, 207 illustrated in FIGS. 1 and 2. The energy storage system may be controlled by the local controller (for example the local plant controller 115 or the hybrid plant controller 215, in particular together with the substation control unit 251).

Based on the energy production forecast 365, the energy market price forecast 369 and the status of the power plant 367, the energy management system 313 schedules the generation of the hybrid plant for the next time frame. Internal algorithms may calculate the most adequate power generation and storage management strategy to achieve a specific goal, when considering also the technical requirements and incorporating them in its mathematical model formulation. The plant schedule 361 may be updated every time it is required or there is a change in the calculation of power references. Furthermore, any logics to confirm the validity of the new power references may be considered. Each energy management service (comprised in the energy management system 313, for example) may schedule the generation of the hybrid plant according to its own functionality and its inputs: forecast, pricing, plant status and so on. The power references (for example Ptarget at the different time points), t, t+1, t+2, t+3, t+4, t+5 illustrated in FIG. 3 of this power schedule may not be executed directly by the local plant controller. They may be considered as the target power reference. The final power output may also consider other conditions, such as local grid status, external system operator set points, etc.

FIG. 4 illustrates the power generation schedule procedure in a more compact manner, wherein a forecast service 471 provides the wind power forecast 473 as an example of a production forecast 365. The forecast service 471 further provides a solar radiation power forecast 475 and further provides the energy price forecast 469.

In particular, the forecast service 471 may provide power production and price forecasts, based on Weather forecasts (Wind and Solar) data bases and telemetry of local weather conditions.

The forecasts 477 are provided to the enterprise control module 479 as an example of an implementation of an energy management system as is for example illustrated in FIG. 3. The enterprise control module 479 calculates the optimized power generation schedule 461 and provides it to the power plant 400 or its controller or its energy generating units and energy storage units. The power plant 400 communicates to the enterprise control unit 479 the status 481 of the energy storage system, for example energy storage system 107 or 207 illustrated in FIGS. 1, 2.

FIG. 5 schematically illustrates an aspect of the hybrid plant controller as performed in embodiments of the present invention. The energy management system 513 creates the power production schedule 561 and transmits it to the plant controller 515. The power targets or scheduled active power, for example Ptarget, at the different points in time in the future, may relate to the corresponding values at the point of common connection 525.

Grid control applications, for example executed or performed by the local plant controller 115, 215, 515 illustrated in FIG. 1, 2 or 5 may pursue the compliance of the grid code requirements by improving the integration of the renewable power plant into the grid and may help to maintain overall grid stability. Thereby, based on the selected grid code application and the internal implemented algorithms, the local controller may for example output the overall active power to be generated by the hybrid plant, including for example the wind turbines, inverters and battery inverters, considering the following inputs:

the target generation schedule received from the energy management system
the current state of the hybrid plant
the configuration of the selected grid code application
external commands coming from for example a grid operator or a TSO.

Furthermore, there may be different control modes available to achieve the desired behaviour. During voltage control for example, not only the reactive capability of the wind turbines may be utilized but also the reactive capability of the energy storage system. In particular, the reactive power capability of the STATCOM may be used over the other sources of reactive power. Thereby, the reactive power of the equipment may be used sequentially (or in a parallel manner) on the following order:
1. STATCOM,
2. BESS, i.e. energy storage system,
3. POWER in PV inverter, i.e. photovoltaic inverter
4. wind turbine.

During primary frequency regulation, the energy storage system may provide the capability of overproducing and consuming power from the grid by discharging and charging it, thus contributing to system stability. Regarding spinning reserve, the energy storage system may allow the facility to work at available power and respond to the primary, secondary or tertiary regulation by using the energy stored in the batteries or storage units.

Smoothing of energy output may consist of stabilizing (and/or reducing high frequency power variations) the power output of the plant by charging/discharging the energy storage system.

The mode "base load" may be implemented in a way that a high capacity battery is used in order to ensure a minimum level of generated power on the power plant. Sizing of the energy storage system may take into account the coincidence of energy resource as well as the minimum power level and duration to be assured. There may be no upper limit to the generation as opposed to the control mode of "capacity firming".

In the mode "power curtailment", a maximum power limit may be established for curtailment. Thereby, the generation is limited by either storing the excess of energy in the battery or by limiting the generation of the energy or power.

In the control mode "power target" it is followed an external power reference set point. It may differ from the power curtailment mode in the fact that the power curtailment only establishes the maximum limit that can be produced but the power target is a reference that shall be met.

In the mode "power limit", active power production is limited to a certain value. The generation of energy or power is limited by either storing the excess of energy in the battery or by limiting the generation.

There may be a small difference with respect to "power curtailment" in that "power limit" may be a fixed (adjusted in the settings) protection limit used to stablish the total maximum output power of the plant.

"power curtailment" in contrast may be rather a control signal that can be fixed or may vary, both by the control or externally (i.e. by a TSO) that is used for power control purposes in mind.

Embodiments of the present invention also provide the opportunity to prioritize one of several kinds of energy resources. In particular, the priority may be given to wind energy or solar energy based energy generation units. It may refer to the possibility of selecting the priority and hence how the generation resources are curtailed in order to avoid exceeding the maximum power at the point of common connection.

- Wind power priority: Maximum wind resource utilization is used for power generation. Solar power generation is limited for not exceeding the maximum allowed output of the hybrid plant
- Solar power priority: Maximum solar resource utilization is used for power generation. Wind power generation is limited for not exceeding the maximum allowed power output of the hybrid plant
- Configurable % of each generation (hybrid balance): Maximum use of solar and wind resources is made when available power is below the maximum allowed limit. Hybrid power generation is produced as a percentage of share of solar and wind power when the power from both generation resources is available.

FIG. 6 schematically illustrates aspects of protection functionality as applied according to embodiments of the present invention.

On an ordinate 683, the delivered hybrid power is indicated. When the delivered hybrid power is below a maximum power Pmax, the power plant is controlled according to a normal operation 685. If the power is above the maximum power Pmax but below a first threshold 687, the power plant is controlled in stage 1 representing a regulation margin 689.

If power reaches the first threshold 687 it should start tripping the protections as per the programmed logic.

If power enters Stage 2 (labelled with reference sign 693) it may be, because there are failures over the control of the generated power and the trip of the breakers (action programmed for the 687 threshold). This can be due to multiple reasons such as communication errors for example.

If power reaches second threshold 691, it should trip the Mains breaker. The difference with respect to threshold 695 is on the type of relay used and the current level required to trip them. With 691 the electrical risk may be reduced, because the system will not be overloading.

Thereby, a programmed logic in separate control units may try to trip one of the generation sources first in order to minimize the power output of the plant. If this is not possible, it may try to disconnect the other one and if this is not possible it will try to disconnect the main breaker, for example breaker 235 and/or 237 illustrated in FIG. 2. If opening the main breaker fails, there may open a 51 relay which trips the main MV-CB (for example breaker 235 illustrated in FIG. 2). This may occur at even higher power 695 and corresponding current. It should be understood that the first threshold and the second threshold 687, 691 are configurable and programmable according to the particular application.

As can be taken from FIG. 5 for example, the local plant controller 515 considers for controlling the power plant also at least one grid operator reference 516. This grid operator reference (for example active power reference) may also be considered by the local plant controllers 115 and 215 illustrated in FIGS. 1 and 2 as inputs 116, 216.

According to other embodiments, the whole system may work without the EMS and/or external Grid operator reference, with limited capabilities obviously.

As can be taken from FIG. 2 for example, the local plant controller 215 receives monitoring signals from the measurement equipment 253 and thereby receives status information of the energy generating unit and/or the energy storage unit.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of operating a hybrid power plant, including energy generating units comprising a wind park and at least one unit of another type of a renewable energy source and an energy storage system, the method comprising:

creating, by an energy management system, a power production schedule based on an actual forecast of power production, an actual forecast of energy price and actual hybrid power plant status, the power production schedule including at least scheduled power for points in time in the future;

providing a single common busbar directly connected to all of the energy generating units and the energy storage system, wherein the single common busbar is directly connected via respective unit transformers to the energy generating units and the energy storage system, and wherein the single common busbar provides a combined power output to a plant transformer which transforms the power to a higher voltage and connects at a secondary side to a utility grid; and controlling, during the points in time in the future, by a plant controller, the energy generating units and the energy storage system based on the power production schedule and the actual hybrid power plant status at the points in time in the future, wherein the actual hybrid power plant status is an energy storage system status, to dispatch power according to the power production schedule, but complying with any grid operator reference at the points in time in the future, wherein creating the power production schedule involves application of a mathematical model and/or an optimization process to optimize a selectable target function; and making the hybrid power plant predictable and/or controllable and/or dispatchable, wherein the controlling the energy generating units and the energy storage system is further based on a selected grid code application, wherein the selected grid code application comprises voltage control at a point of common coupling on the single common busbar to which all of the energy generation units and the energy storage system are connected, and wherein the voltage control provides control of reactive power of the energy generating units and the energy storage system in order to keep a voltage at the point of common coupling at or close to a nominal or desired voltage, wherein controlling the energy generating units and the energy storage system is further based on a selected energy source priority, wherein the at least one unit of another type of a renewable energy source is sun energy, the respective energy generating units comprising solar power units, wherein the energy source priority is selected from a group consisting of:
wind power priority: wherein power output of the wind park is maximized, all other types of energy generating units are limited so that a maximum allowed power output or scheduled active power or grid operator reference of the hybrid power plant is not exceeded;
sun power priority: wherein power output of the solar power units is maximized, all other types of energy generating units are limited so that a maximum allowed power output or scheduled active power or grid operator reference of the hybrid power plant is not exceeded; and/or
selectable share: maximum use of solar and wind resources is made when available power is below a maximum allowed limit; hybrid power generation is produced as a percentage of share of solar and wind power when power from both generation resources is available.

2. The method according to claim 1, wherein the actual forecast of power production, comprises:
forecast of power due to wind in the geographical region of the wind park and/or forecast of power due to sun irradiance in the geographical region of solar power units comprised in the hybrid power plant.

3. The method according to claim 1, wherein the power production schedule is created to achieve a desired goal, and/or maximize or minimize a target function, improve profitability and/or reduce power deviations from a previously defined power forecast.

4. The method according to claim 1, wherein the power production schedule is created by applying energy arbitrage and/or applying capacity firming,
wherein during applying energy arbitrage the power production schedule is created such that:
power produced by the energy generating units is stored in the energy storage system, when the energy price is low and
energy is released from the energy storage system, when the energy price is high, to maximize profit,
wherein during applying capacity firming the power production schedule is created to assure a constant and/or predictable and/or dispatchable output power generation capability.

5. The method according to claim 1, wherein the power production schedule is updated at regular points in time, periodically, or irregular points in time.

6. The method according to claim 1, wherein the selected grid code application further comprises:
primary frequency regulation at the point of common coupling;
providing spinning reserve, including to store some of the energy generated by a wind turbine of the wind park in the energy storage system;
smoothing of power fluctuations at the point of common coupling by discharging or charging the energy storage system depending on fluctuating power generated by the energy generating units;
ramp rate depending charging and discharging the energy storage system, including reducing the rate of change or variation of generated power so that it affects less to the utility grid;
base load assurance, wherein capacity of the energy storage system is selected based on minimum power to be output by the hybrid power plant and duration of the minimum power to be assured;
power curtailment of at least one energy generating unit by charging the energy storage system or limiting its power generation;
adhering to the power production schedule or the grid operator reference, by appropriately charging/discharging the energy storage system; and/or
power limit adherence, wherein the energy storage system is charged in order to keep plant output power below a given power limit or wherein the energy generating units are controlled to limit their power generation.

7. The method according to claim 1, wherein the selected grid code application is performed, by a local plant controller, considering at least one of:
the scheduled power;
the actual hybrid power plant status;
at least one grid operator reference.

8. The method according to claim 1, further comprising, in case of a failure of a controller and plant output power exceeds maximum technical or administrative allowed output:
if the plant output power is above a first threshold but below a second threshold,
trying to trip at least one energy generating unit;
if tripping is not successful,
disconnecting the at least one energy generating unit;
if disconnecting is not successful,
opening a main plant breaker, normally connecting the hybrid power plant to the utility grid;
if opening the main plant breaker fails,
a relay at an input of the plant transformer disconnecting the hybrid power plant from the utility grid in case of overcurrent.

9. The method according to claim 1, wherein the scheduled power and/or the grid operator reference relates to a power at a point of common coupling to which all energy generating units and the energy storage system output their power or relates to a power at a different point, a generation unit point of connection and/or storage system point of connection.

10. An arrangement for operating a hybrid power plant, including energy generating units comprising a wind park and at least one unit of another type of a renewable energy source and an energy storage system, the arrangement comprising:
an energy management system adapted to create a power production schedule based on an actual forecast of power production, an actual forecast of energy price and actual hybrid power plant status, the power production schedule comprising at least scheduled power for points in time in the future;
a single common busbar directly connected to all of the energy generating units and the energy storage system, wherein the single common busbar is directly connected via respective unit transformers to the energy generating units and the energy storage system, and wherein the single common busbar provides a combined power output to a plant transformer which transforms the power to a higher voltage and connects at a secondary side to a utility grid; and
a plant controller adapted to control, during the points in time in the future, the energy generating units and the energy storage system based on the power production schedule and the hybrid power plant status at the points in time in the future, wherein the actual hybrid power plant status is an energy storage system status, to dispatch power according to the power production schedule, but complying with any grid operator reference at the points in time in the future, wherein the control of the energy generating units and the energy storage system is further based on a selected grid code application, wherein the selected grid code application comprises voltage control at a point of common coupling on the single common busbar to which all of the energy generation units and the energy storage system are connected, wherein the voltage control provides control of reactive power of the energy generating units and the energy storage system in order to keep a voltage at the point of common coupling at or close to a nominal or desired voltage, wherein controlling the energy generating units and the energy storage system is further based on a selected energy source priority, wherein the at least one unit of another type of a renewable energy source is sun energy, the respective energy generating units comprising solar power units, wherein the energy source priority is selected from a group consisting of:

wind power priority: wherein power output of the wind park is maximized, all other types of energy generating units are limited so that a maximum allowed power output or scheduled active power or grid operator reference of the hybrid power plant is not exceeded;

sun power priority: wherein power output of the solar power units is maximized, all other types of energy generating units are limited so that a maximum allowed power output or scheduled active power or grid operator reference of the hybrid power plant is not exceeded; and/or selectable share: maximum use of solar and wind resources is made when available power is below a maximum allowed limit; hybrid power generation is produced as a percentage of share of solar and wind power when power from both generation resources is available.

11. A hybrid power plant, including:

energy generating units comprising a wind park and at least one unit of another type of a renewable energy source, sun energy;

an energy storage system; and the arrangement according to claim 10.

* * * * *